United States Patent [19]
Bright

[11] Patent Number: 5,569,473
[45] Date of Patent: Oct. 29, 1996

[54] APPARATUS FOR FORMING A RECYCLABLE LINED CONTAINER

[75] Inventor: Stephen A. Bright, Troy, Ohio

[73] Assignee: Electra Form, Inc., Vandalia, Ohio

[21] Appl. No.: 447,742

[22] Filed: May 23, 1995

[51] Int. Cl.⁶ .................................................. B29C 49/22
[52] U.S. Cl. ......................... 425/523; 220/403; 264/513; 425/533
[58] Field of Search .................................. 425/523, 525, 425/533, 526, 210, 537, 225–227, 232; 220/403; 264/512, 513, 516, 537

[56] References Cited

U.S. PATENT DOCUMENTS

| | | | |
|---|---|---|---|
| 3,091,000 | 5/1963 | Makowski | 264/513 |
| 3,406,853 | 10/1968 | McLeod | 215/11.3 |
| 3,739,827 | 6/1973 | Sondel | 220/403 |
| 3,933,263 | 1/1976 | Frew et al. | 215/12.1 |
| 3,943,219 | 3/1976 | Aoki | 264/513 |
| 4,013,748 | 3/1977 | Valyi | 264/102 X |
| 4,109,813 | 8/1978 | Valyi | 220/453 X |
| 4,127,430 | 11/1978 | Davis | 425/525 X |
| 4,648,824 | 3/1987 | Aoki | 425/150 |
| 4,726,756 | 2/1988 | Aoki | 425/526 |
| 4,732,557 | 3/1988 | Aoki | 425/522 |
| 4,741,688 | 5/1988 | Aoki | 425/526 |
| 4,744,742 | 5/1988 | Aoki | 425/523 X |
| 4,941,816 | 7/1990 | Aoki, deceased et al. | 425/533 |
| 5,049,349 | 9/1991 | McCullough et al. | 264/515 |
| 5,080,574 | 1/1992 | Koga et al. | 425/526 |
| 5,102,610 | 4/1992 | Koga | 264/532 |
| 5,253,999 | 10/1993 | Kosuge | 425/575 |

Primary Examiner—Richard L. Chiesa
Attorney, Agent, or Firm—Locke Reynolds

[57] ABSTRACT

An apparatus for manufacturing a recyclable container includes a mechanism for holding a reusable shell, fitting a liner preform over the reusable shell, and blow forming the liner preform within the reusable shell to provide a disposable liner for the reusable shell. The disposable liner is removable to permit recycling of the reusable shell. In a preferred embodiment, the mechanism is an integrated injection mold and stretch blow mold machine that both creates the liner preform and blow forms the liner into reusable shell.

8 Claims, 4 Drawing Sheets

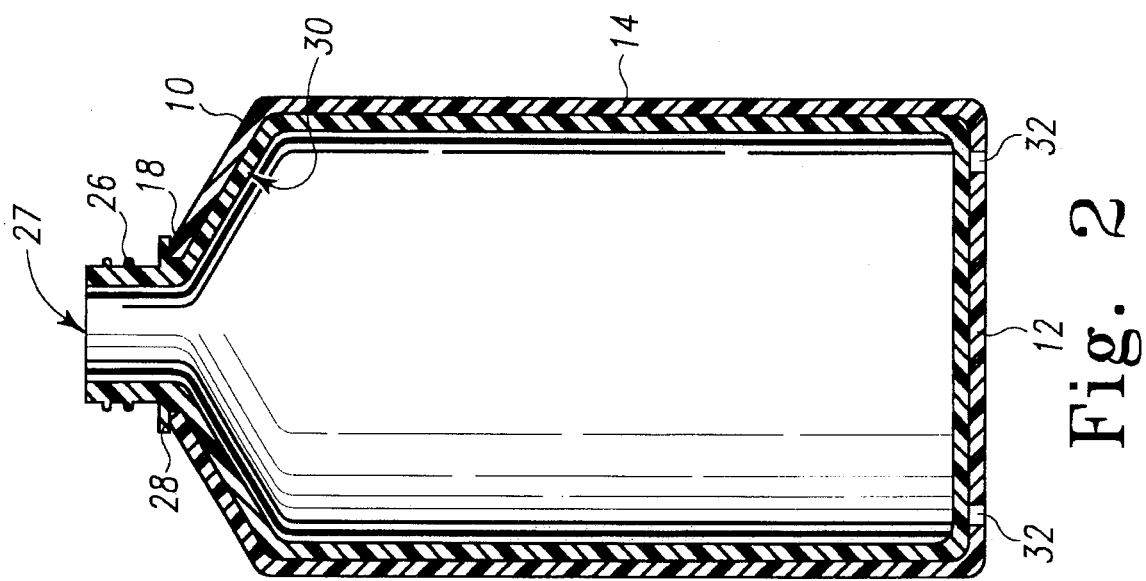
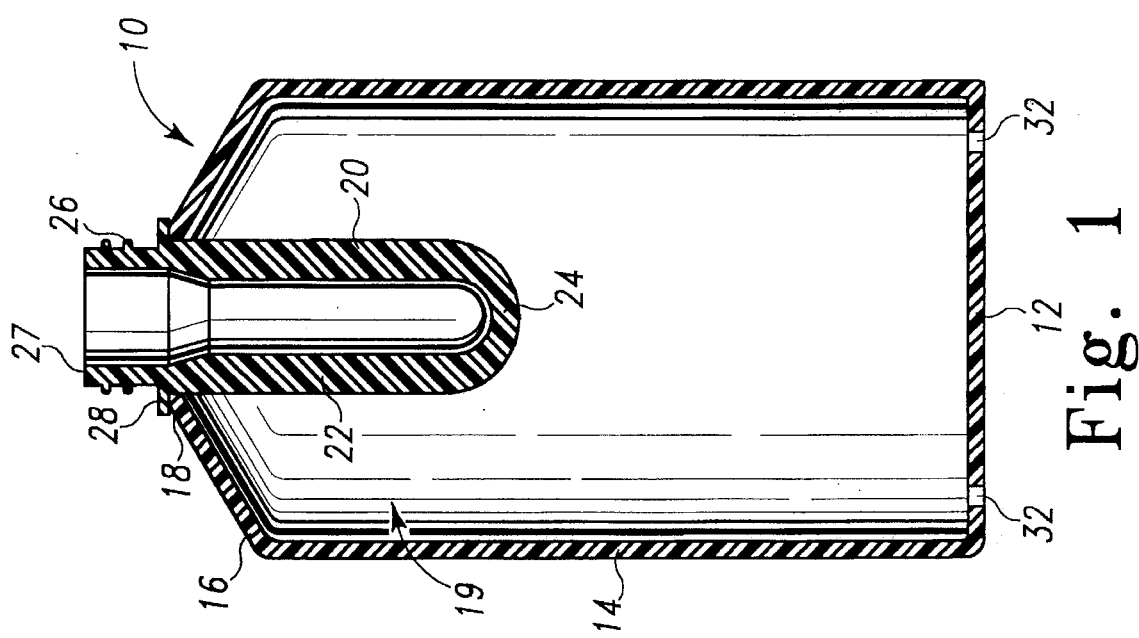

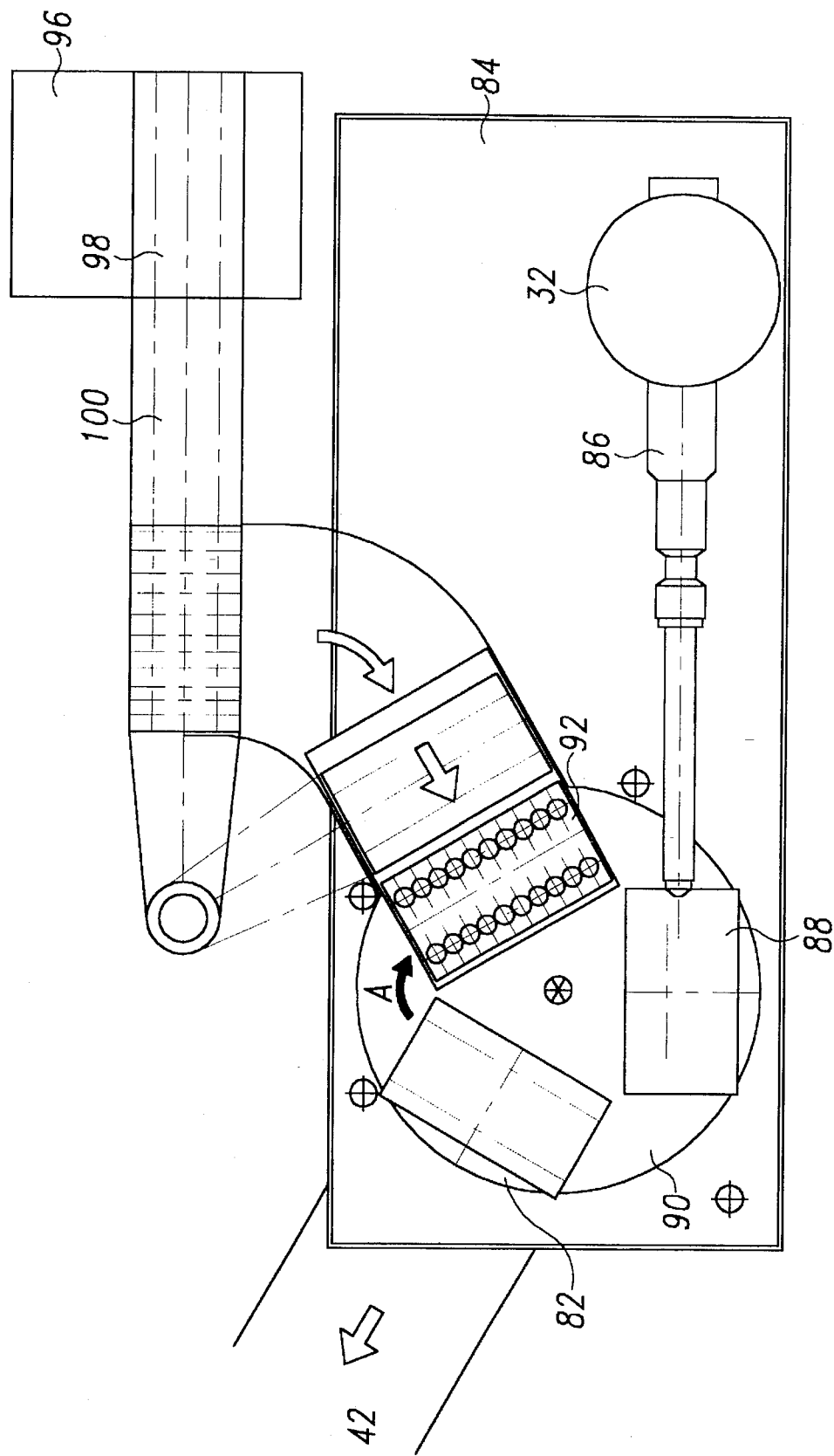

APPARATUS FOR FORMING A RECYCLABLE LINED CONTAINER

BACKGROUND OF THE INVENTION

The present invention is directed to a method and apparatus for manufacturing a recyclable container having a disposable liner. More particularly, the present invention is directed to container having a disposable liner within a reusable shell, which together forms a clean, sanitary, recyclable container which does not need to be sterilized after each use.

Disposable liners for containers have long been used to simplify cleaning of the container and, as is the case with disposable infant formula holders, to allow for withdrawal of formula without requiring introduction of air into the container as in McLeod, U.S. Pat. No. 3,406,853. Disposable liners have also been used for a vacuum bottle for storing hot or cold liquids as described in Frew, et al., U.S. Pat. No. 3,933,263 in order to keep the inside of the vacuum bottle free from residue. A similar disclosure involving reuse of a semi-rigid shell that supports a disposable liner fitted inside the shell is found in Sondel, U.S. Pat. No. 3,739,827.

However, known liner/container systems typically require complex or unwieldy holding devices for joining the liner to the reusable container. In many conventional designs, a liner must be manually inserted into a container, and a threaded lid screwed onto the container to catch and hold the disposable liner. What is needed is an efficient, fully automateable procedure and apparatus for making containers having disposable liners. This procedure must not require complex molding for the container, or unnecessary thread, latch, or catch mechanisms for holding the disposable liner.

It has been suggested to blow mold a double layered container by blow molding a liner within an outer container shell using an injection molded parison or preform to form the liner. In Makowski, U.S. Pat. No. 3,091,000 and Aoki, U.S. Pat. No. 3,943,219, a parison for a liner is molded around a core pin in an injection mold. The core pin is then employed to insert the parison into a container shell and an inflating fluid is introduced through the core pin to blow mold the parison into a liner within the outer container shell. Neither the Makowski container shell nor the Aoki container shell is disclosed to be reusable and neither liner is disclosed to be removable. Additionally, the liners disclosed in Makowski and Aoki fail to provide a means for a sanitary seal between the liner and a closure for the container thus requiring that the container shell be made sanitary prior to use with foods or beverages.

SUMMARY OF THE INVENTION

The present invention provides a method for manufacturing a recyclable container which includes the steps of holding a reusable shell, fitting a liner preform over the reusable shell, and blow forming the liner preform to provide a disposable liner within the reusable shell, the liner including at least a lip or finish portion for engaging a closure so as to form a sanitary enclosure free from contents contact with the shell. The disposable liner is configured to be removable to permit recycling of the reusable shell, which can be washed and reequipped with another liner for further use.

An integrated system for forming plastic liner preforms which can be situated over the mouth of, and blow mold formed within an interior of, a recycled container in accordance with the present invention provides a container having a disposable liner that does not need to be mechanically attached with auxiliary mechanisms, and yet is easily removed to enable recycling of the container.

In one preferred embodiment of the method of the present invention, the liner preform including at least a lip portion for engaging a closure is formed by an injection molding at a first station of an integrated plastic injection and blow mold machine. The reusable shell is held at a second or subsequent station of the integrated plastic injection and blow mold machine, and the liner preform is moved by the lip or finish portion to that subsequent station to fit over the mouth of the reusable shell. The liner preform is then blow formed, resulting in expansion of the liner preform to form a disposable liner within the reusable shell with the lip portion covering the mouth of the reusable shell. Finally, the recyclable container formed by the combination of the disposable liner and the reusable shell is moved to a third or final station of the integrated plastic injection and blow mold machine for ejection and further processing. Again, this preferred method is ideally a component of a complete recycling system that permits for reuse of the reusable shell by removing a disposable liner from a previously used reusable shell and sanitizing the previously used reusable shell prior to holding it for insertion of a liner preform.

In addition to the described methods, the present invention provides a recyclable container that includes a reusable shell having an interior and a disposable liner which includes a lip or finish portion for sealing engagement with a closure. The liner other than the lip or finish portion is fitted within the interior of the shell. The disposable liner is formed by blow forming a liner preform fitted over the reusable shell, with the disposable liner being removable to permit recycling of the reusable shell.

Such a recyclable container can be formed by an apparatus that includes an integrated plastic injection and blow mold machine having a first station for forming a liner preform by injection molding. A holding mechanism is provided for positioning a reusable shell at a second or subsequent station of the integrated plastic injection and blow mold machine. A moving mechanism, holding only the lip or finish portion of the liner preform, moves the liner preform to the subsequent station to fit over the reusable shell so that a blow forming assembly can expand the liner preform into the reusable shell to form a disposable liner. The moving mechanism moves the recyclable container formed by the combination of the disposable liner and the reusable shell to a third or final station of the integrated plastic injection and blow mold machine for ejection.

In one embodiment of the apparatus of the present invention, a removal assembly for removing a disposable liner from a previously used reusable shell can be coupled to the integrated plastic injection and blow mold machine for simultaneous operation. A cleaning assembly takes the reusable shell from the removal assembly, sanitizes the previously used reusable shell, and then transfers the reusable shell to the holding mechanism of the integrated plastic injection and blow mold machine for receipt of new liner preform. The disposable liner can also contribute to formation of additional reusable shells by being ground to a size suitable for use in an injection molding process, washed to form a clean recyclate, and, if necessary, mixed with a suitable amount of virgin polymer and used to form new reusable shells.

One feature of the present invention is the relative ease and low cost of manufacturing a container having a disposable liner within a reusable shell, which together forms a clean, sanitary, recyclable container which does not need to be sterilized after each use. This feature has the advantage of configuring a disposable liner to be removable to permit recycling of the reusable shell, which can be washed and reequipped with another liner for subsequent use.

Additional features and advantages of the present invention will be apparent to those skilled in the art upon consideration of the following detailed description of a preferred embodiment illustrated in accompanying drawings.

BRIEF DESCRIPTION OF THE DRAWINGS

FIG. 1 is a sectional view of a liner preform including a finish portion for engaging a closure situated within a reusable shell prior to blow mold forming of the liner.

FIG. 2 is a sectional view of a recyclable container formed as a result of the blow molding of the liner preform shown in FIG. 1.

FIG. 5 is a schematic plan view of an alternative integrated injection mold and blow forming machine for accomplishing the present invention.

DESCRIPTION OF PREFERRED EMBODIMENTS OF THE INVENTION

Figure 3:
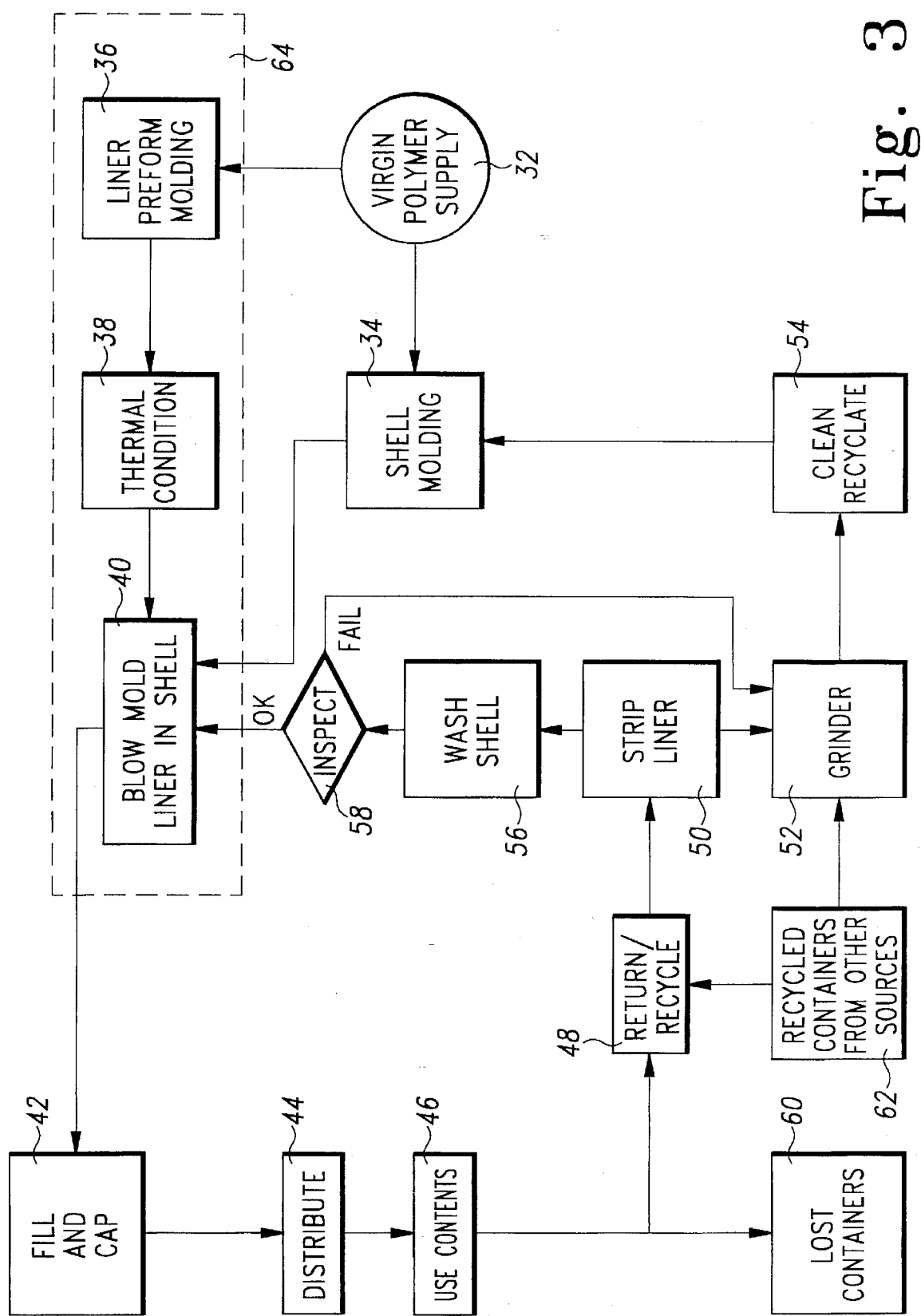
FIG. 3 is a block diagram of a process for making recyclable containers according to the present invention employing recyclate of the liner resin to make additional shells.

A recyclable container shell 10 is shown in cross section in FIG. 1 which includes a base 12, a sidewall 14, and a shoulder portion 16 leading to a mouth 18 opening into the interior 19 of the shell 10. A preform 20 for forming a liner suitable for contact by foods and beverages is received within the mouth 18 of the shell 10. The preform 20 includes a body portion 22 including a closed lower end 24, a finish portion 26 adapted to receive a closure (not shown), and a support ring 28 separating the body portion 22 from the finish portion 26, the support ring 28 supporting the preform 20 on the mouth 18 of the shell 10. The finish portion 26 includes a lip portion 27 designed to provide a sanitary sealing surface for contact by a closure (not shown) engaging the finish portion 26.

The combination of the shell 10 and preform 20 are joined as shown in FIG. 1 only momentarily before the preform is blown by a high pressure fluid such as air into the form of a liner 30 as shown in FIG. 2. The liner 30 is installed by blow molding the liner 30 within the shell 10 using the reusable shell 10 as a mold to define the shape of the liner 30. The base 12 of the shell 10 includes at least one small aperture 32 for permitting the escape of air from between the shell 10 and preform 20 during the blow molding process. The blow molding process results in a disposable liner 30 which is contiguously situated within the sidewall 14 of the shell 10 in intimate contact with the interior 19. The shell 10 is preferably substantially thicker than the liner to provide structural support, durability, and protection for the thin, disposable liner 30 which is intended to be sufficiently easily deformed to permit the liner 30 to be stripped out of the shell 10 subsequent to use. The presence of the finish portion 26 on the liner 30 allows the shell 10 when used in food containing uses to be recycled after washing but without the need for sterilization. The sterilization of the shell 10 can be avoided since the shell does not come into contact with the container contents even during a normal dispensing of the contents from the container due to the presence of the finish portion 26 extending well above the top of the shell 10.

The liner 30 and reusable shell 10 can be formed of the same or different plastic materials. In one preferred embodiment, the shell 10 is formed of recycled polyethylene terephthalate (PET) resin while the liner 30 is formed of virgin PET resin. Other resins can be employed as a common resin for both the shell and the liner including polypropylene, high-density polyethylene, polystyrene, polycarbonate, polyamide, and polyetherimide. In this embodiment of the invention, the use of a common resin for both the shell 10 and the liner 30 permits the reuse of the liner as a feed stock for the manufacture of additional shells 10 as shown in FIG. 3.

At the start-up of the process, a source of virgin polymer 32 supplies polymer to a first molding apparatus 34 which molds the polymer into shells 10. The virgin polymer 32 is also supplied to a second molding apparatus 36 which molds liner preforms 20. Each liner preform 20 is then thermally conditioned to blow molding temperatures at a conditioning station 38. Each liner preform 20 is then quickly situated within the previously molded shell 10 positioned in a blow molding apparatus 40 where the preform 20 is expanded to form a liner 30.

The combined liner and shell is then transferred to a filling and capping operation 42 where a desired liquid is sealed within the container. The filled container is then distributed through a distribution process 44 to consumers 46 of the container contents. Once the contents of the container has been consumed by the consumer 46, the container is collected through a recycle/return program 48 for reuse of the various portions of the container.

Following collection, the liner 30 is stripped from the molded shell 10 in a stripping operation 50. The liner 30 is directed to a grinding operation 52 which reduces the plastic forming the liner 30 to particulate form. The particulate plastic is then subjected to a washing or other cleaning process 54 to form a clean particulate recyclate polymer suitable for use in the molding of shell 10 in molding apparatus 34. The shells 10 output from the stripping operation 50 are subjected to a washing process 56 in preparation for reintroduction into the blow molding apparatus 40. The washed shells are subjected to an inspection 58 for physical integrity which if failed will cause the shells to be directed to the grinding operation 52.

As the process continues, the proportion of shells 10 supplied to the liner blow molding operation 40 from the inspection process 58 will increase thus lowering the demand for new shells from the shell molding operation 34. Once the supply of clean recyclate 54 is sufficient to satisfy the requirements for new shells in the shell molding operation 34, a continuous flow of virgin polymer from source 32 will still be desirable to supply the liner preform molding operation 36. This ensures only virgin materials are used in direct contact with the container contents. It will be appreciated that at least some containers will be removed from the reuse cycle through inappropriate disposal 60. On the other hand, suitable polymers for use in the process of the present invention could be supplied from other recycling sources 62 such as the reclaiming of conventional one piece single use containers.

Figure 4:
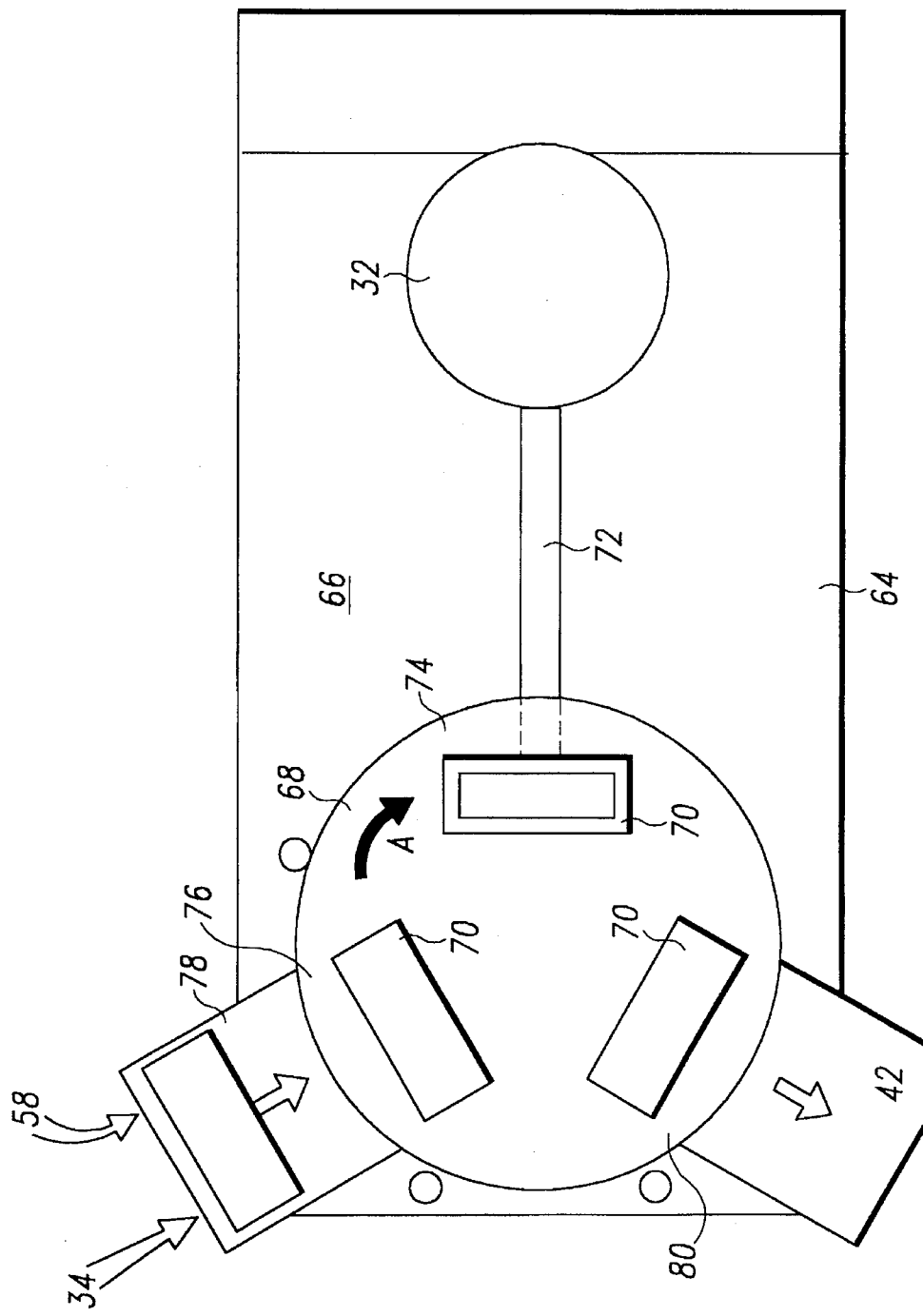
FIG. 4 is a schematic plan view of an integrated injection mold and blow forming machine for accomplishing the process diagrammed in FIG. 3.

An integrated stretch blow mold machine 64 suitable for carrying out steps 36, 38 and 40 of the process is illustrated in FIG. 4. The machine 64 is an integrated injection mold and stretch blow mold machine which has been modified to receive a supply of recycled shells 10 into which molded preforms 20 can be blow molded to form liner 30. The machine 64 includes a base 66 and a carriage 68 which revolves in step-wise fashion in direction A. The carriage 68 includes three pallets 70, each pallet including a plurality of mold portions for forming the lip and finish portion of the liner preforms 20. The machine 64 also includes an injection molding assembly 72 for forming the liner preforms 20 between an injection mold core and cavity elements at a first station 74, from resin supplied from source 32.

The liner preforms 20 formed at the first station 74 are thermally conditioned to the correct temperature for blow molding and carried by pallet 70 by rotation of the carriage 68 to a second station 76. The machine 64 includes a shell infeeder 78 which inserts a plurality of reusable shells 20 taken from supplies 34 and 58. The liner preforms 20 are then expanded by pressurized air and, if required, by action of stretch rods to form the disposable liner 30 within each reusable shell 10 at the second station 76. The carriage 68 then rotates to move the pallet 70 containing the conjoined liners 30 and shells 10 forming recyclable containers to a third station 80 where they are ejected for delivery to the filling and capping operation 42.

It is also not necessary to provide fully formed reusable shells to an integrated stretch blow mold machine for practice of the present invention. As illustrated in FIG. 5, it is possible to simultaneously blow mold form the reusable shell 10 and the liner preform 20 at a third station 82 of a specially modified integrated stretch blow mold machine 84. The machine 84, like machine 64 of FIG. 4, has an integrated injection assembly 86 that forms liner preforms 20 at a first station 88 on a revolving carriage 90. The liner preforms 20 are moved into position over non-blown reusable shell preforms at a second station 92, and the shell and liner are assembled generally in the manner disclosed in my co-pending U.S. Pat. application 08/194,427 filed Feb. 10, 1994. The assembled shell and liner preforms are then simultaneously blow molded at the third station 82 to form a recyclable container having a strippable liner 30. The container consisting of the shell 10 and liner 30 is then moved to a fourth station for ejection to the filling and capping apparatus 42.

As can be seen in FIG. 5, the preform for the reusable shell can be formed by an adjacent injection mold machine 96 which passes the shell preforms on a pallet 98 through a reheat oven 100 to achieve the correct temperature for the combined blow molding at the third station 82. Alternatively, the preforms for the reusable shell can be formed simultaneously with the liner preforms 10 in adjacent molds in the same molding machine 64. As the revolving carriage 90 moves from the first station 88 to the second station 92, the molded preforms are moved from horizontal adjacency to vertical alignment to permit the assembly of the preforms at the third station 82.

While the present invention has been described in connection with specific embodiments, it will be apparent to those skilled in the art that various changes amy be made therein without departing from the spirit or scope of the invention as set forth in the following claims.

What is claimed is:

1. An apparatus for forming a recyclable container, the apparatus comprising an integrated plastic injection and blow mold machine having a first station for forming a liner preform by injection molding, a holding mechanism for positioning a previously used reusable shell at a second station of the integrated plastic injection and blow mold machine, a first moving mechanism for moving the liner preform to the second station to fit within the reusable shell, a blow forming assembly for expanding the liner preform within the reusable shell to form a disposable liner so that the reusable shell acts as a mold defining the shape of the disposable liner, the disposable liner contiguously situated in intimate contact with the reusable shell, a second moving mechanism for moving the recyclable container formed by the combination of the disposable liner and the reusable shell to a third station of the integrated plastic injection and blow mold machine for ejection, and a cleaning assembly for sanitizing the reusable shell prior to transfer to the holding mechanism.

2. The apparatus of claim 1, further comprising a removal assembly for removing a previously used disposable liner from a previously used reusable shell.

3. The apparatus of claim 1, further comprising a thermal conditioning assembly for thermally conditioning the liner preform to have a predetermined temperature prior to expanding the liner preform.

4. An apparatus for forming a recyclable container, the apparatus comprising a cleaning assembly for sanitizing a previously used reusable shell, a first station having a holding mechanism for positioning the shell, a first moving mechanism for moving the shell from the cleaning assembly to the first station, a second station for forming a liner preform by plastic injection molding, a second moving mechanism for moving the liner preform to the first station to fit within the shell, a blow forming assembly for expanding the liner preform within the shell to form a disposable liner so that the shell acts as a mold defining the shape of the liner, the liner including a body portion contiguously situated in intimate contact with the shell, and a third station for ejecting a recyclable container formed by the combination of the liner and the shell.

5. The apparatus of claim 4, wherein the second station includes a finish forming mechanism for forming the liner preform to have a finish portion adapted to receive a closure, and the blow forming assembly includes a locating mechanism for locating the finish portion adjacent to an opening defined by the shell.

6. The apparatus of claim 4, further comprising a removal assembly for removing a previously used disposable liner from a previously used reusable shell.

7. The apparatus of claim 4, further comprising a thermal conditioning assembly for thermally conditioning the liner preform to have a predetermined temperature prior to expanding the liner preform.

8. An apparatus for forming a recyclable container, the apparatus comprising a cleaning assembly for sanitizing a previously used reusable shell, a first station having a holding mechanism for positioning the shell, a first moving mechanism for moving the shell from the cleaning assembly to the first station, a second station for forming a liner preform by plastic injection molding and including a finish forming mechanism for forming the liner preform to have a finish portion adapted to receive a closure, a second moving mechanism for moving the liner preform to the first station to fit within the shell, a blow forming assembly for expanding the liner preform within the shell to form a disposable liner so that the shell acts as a mold defining the shape of the liner, the liner including a body portion contiguously situated in intimate contact with the shell, the blow forming assembly including a locating mechanism for locating the finish portion adjacent to an opening defined by the shell, a third station for ejecting a recyclable container formed by the combination of the liner and the shell, a removal assembly for removing a previously used disposable liner from a previously used reusable shell, and a thermal conditioning assembly for thermally conditioning the liner preform to have a predetermined temperature prior to expanding the liner preform.

* * * * *